United States Patent Office 3,185,687
Patented May 25, 1965

---

3,185,687
4-NITRO-PYRIDAZINES
Hideo Kano, Koromodanadorimarutamachi-agaru, Kamikyo-ku, Kyoto-shi, and Masaru Ogata, Higashinada-ku, Kobe-shi, Japan, assignors to Shionogi & Co., Ltd., Osaka, Japan
No Drawing. Filed Dec. 4, 1962, Ser. No. 242,069
Claims priority, application Japan, Feb. 26, 1962, 37/7,479
3 Claims. (C. 260—250)

The present invention relates to 4-nitro-pyridazine compounds. More particularly, it relates to the 3-alkoxy-4-nitro-6-alkylpyridazine-1-oxides corresponding to the formula:

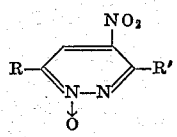

wherein R is lower alkyl (e.g. methyl, ethyl, propyl, etc.) and R' is lower alkoxy (e.g. methoxy, ethoxy, propoxy, etc.), and process for their production.

The process according to the present invention comprises oxidizing the 3-alkoxy-6-alkylpyridazines corresponding to the formula:

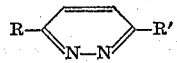

wherein R and R' have the precedingly-recited significances, and nitrating the resulting 3-alkoxy-6-alkylpyridazine-1-oxides corresponding to the formula:

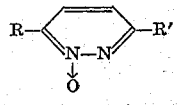

wherein R and R' again have the aforesaid significances, to give the 3-alkoxy-4-nitro-6-alkylpyridazine-1-oxides corresponding to Formula I.

Regarding the process, the above order of nitration and oxidation is critical for successfully obtaining the said compound I, because the product having a nitro group at the 4-position can only be difficultly prepared by direct nitration of compound II without the previous oxidation. However, the oxidation step per se in the above process is known [Kumagai, J. Chem. Soc. Japan, 81, 1148 (1960)], and should be understood per se not to be within the scope of the present invention.

The starting materials, 3-alkoxy-6-alkylpyridazines, corresponding to Formula II may be produced by a conventional method [Overend et al., J. Chem. Soc., 239 (1947)]. The compound II is firstly subjected to oxidation by treatment with hydrogen peroxide in acetic acid at a temperature from 60 to 90° C. Alternatively, the oxidation may be accomplished with perbenzoic acid as the oxidizing agent. Although the use of perbenzoic acid is advantageous in that the reaction can be performed under such mild conditions as to avoid side reaction, the use of hydrogen peroxide is preferred at the industrial scale in view of low cost. The resulting compound III is then subjected to nitration by treatment with a nitrating agent such as nitric acid, a mixture of nitric acid and sulfuric acid, a combination of an inorganic nitrate (e.g. sodium nitrate, potassium nitrate) with sulfuric acid and nitrogen dioxide, if necessary, in a suitable medium such as sulfuric acid, glacial acetic acid and nitrobenzene. Of the said nitrating agents, the use of a mixture of nitric acid and sulfuric acid is the most suitable for the industrial production in easy availability. Ordinarily, the nitration can be accomplished by heating the compound III with a mixture of fuming nitric acid and concentrated sulfuric acid on a water bath for several hours.

The thus-produced 3-alkoxy-4-nitro-6-alkylpyridazine-1-oxides corresponding to Formula I show not only antimicrobial activity but also antiprotozoal activity. For instance, the in vitro sensitivity of bacteria and fungi to 3-methoxy-4-nitro-6-methylpyridazine-1-oxide corresponding to Formula I wherein R is methyl and R' is methoxy was determined by an agar streak dilution method. Serial two-fold dilutions of the said compound were prepared in appropriate media and the surface of the agar was streaked with suitable dilutions of young cultures. The minimum inhibitory concentrations were found for each organism as the lowest concentration of the said compound at which there was no visible growth of bacteria and fungi. The results are shown in the following table:

TABLE 1

*Antibacterial and antifungal spectra of 3-methoxy-4-nitro-6-methylpyridazine-1-oxide (as determined by agar-streak method)*

| Test Organisms | Minimum inhibitory concentration (mcg./ml.) | Media |
| --- | --- | --- |
| Shigella dysenteriae | 10.0 | Peptone-meat extract agar |
| Shigella paradysenteriae | 10.0 | |
| Salmonella typhosa | 20.0 | |
| Salmonella paratyphi A | 10.0 | |
| Escherichia coli | 20.0 | |
| Pseudomonas aeruginosa | >50.0 | |
| Klebsiella pneumoniae | 20.0 | |
| Bacillus subtilis, PCI-219 | 0.5 | |
| Bacillus anthracis | 2.0 | |
| Staphylococcus aureus 209 P | 10.0 | |
| Salcina lutea | 50.0 | |
| Trichophyton pedis | 25.0 | 2% Glucose-Sabouraud's agar |
| Trichophyton purpurem | 6.3 | |
| Trichophyton rubrum | 6.3 | |
| Trichophyton gypseum | 12.5 | |
| Trichophyton mentagrophytes | 25.0 | |
| Trichophyton interdigitale | 50.0 | |
| Candida albicans | >100.0 | |
| Candida tropicalis | >100.0 | |
| Aspergillus glaucus | 1.6 | |
| Aspergillus oryzae | 25.0 | |
| Aspergillus niger | 50.0 | |
| Penicillium digitatum | 1.6 | |
| Rhodotorula sp. | >100.0 | |
| Saccharomyces cerevisiae | 25.0 | |
| Torula sp. | 100.0 | |

NOTE.—Bacteria, readings after 2 days at 37° C.; Trichophyton, readings after 10 days at 28° C.; Aspergillus and Penicillium, readings after 3 days at 28° C.; Candida and yeast, readings after 2 days at 28° C.

In the test for antiprotozoal activity, the minimal inhibitory concentration was determined by a broth dilution method on V-medium plus 10 percent bovine serum using *Trichomonas vaginalis* (strain Yoshida) as the test organism, the composition of the said V-medium being as follows:

Aqueous cow liver extract _____ milliliters__ 100
Peptone _____ grams__ 2.0
Sodium chloride _____ do____ 0.5
Cysteine hydrochloride _____ do____ 0.2
Yeast extract _____ do____ 0.2
Glucose _____ do____ 1.0
Adjusted to pH 5.8.

The medium was inoculated with a 48 hours' culture of the organism, and end point determinations were read by visual inspection at 7 days. For comparison, tests were also run using the heretofore known anti-Trichomonas agents, i.e. trichomycin (cabimicina) and 1-β-hydroxyethyl-2-methyl-5-nitroimidazole. The results are shown in the following table:

TABLE 2

*Antiprotozoal activity of 3-methoxy-4-nitro-6-methylpyridazine-1-oxide (as determined by broth dilution method)*

| Test organism | Minimum inhibitory concentration (mcg./ml.) | | |
|---|---|---|---|
| | 3-Methoxy-4-nitro-6-methylpyridazine-1-oxide | Trichomycin | 1-β-Hydroxyethyl-2-methyl-5-nitroimidazole |
| *Trichomonas vaginalis* (strain Yoshida) | 0.2 | 0.8 | 0.4 |

From the above results, it is found that 3-methoxy-4-nitro-6-methylpyridazine-1-oxide possesses a remarkable antiprotozoal activity, e.g. anti-Trichomonas activity, in addition to antimicrobial activity. The other 3-alkoxy-4-nitro-6-alkylpyridazine-1-oxides corresponding to formula I possess similar activities for inhibiting the growth of various microorganisms. Accordingly, they are particularly useful for locally treating *Trichomonas vaginalis* in the female. They are also useful for controlling mixed infections with pathogenic microorganisms in vaginitis of Trichomonal origin. They are also useful for classifying microorganisms or obtaining pure cultures of single organisms where a susceptible organism may be separated from a resistant one.

Practical and presently preferred embodiments of the present invention are illustrated by the following examples. In these examples, parts by weight bear the same relationship to parts by volume as do grams to milliliters. Percentages are by weight. Temperatures are in degrees centigrade.

EXAMPLE 1

A mixture of 3 parts by weight of 3-methoxy-6-methylpyridazine, 18 parts by volume of glacial acetic acid and 6 parts by volume of 30% hydrogen peroxide (aqueous) is heated for 3 hours at 70° C. Then 6 more parts by volume of the 30% hydrogen peroxide are added to the resultant mixture and the whole heated for 3 hours at the same temperature. To the reaction mixture, there is added water (10 parts by volume), and the resulting mixture is concentrated under reduced pressure to remove acetic acid. After neutralization with sodium carbonate, the solution is extracted with chloroform, and the chloroform layer is evaporated. The residue is crystallized from petroleum benzin to give 3-methoxy-6-methylpyridazine-1-oxide (2.5 parts by weight) as colorless plates melting at 95 to 96° C.

To a mixture of concentrated sulfuric acid (1 part by volume) and fuming nitric acid (0.2 part by volume), there is added the above-prepared 3-methoxy-6-methylpyridazine-1-oxide (0.2 part by weight) while ice-cooling, and the resultant mixture is heated for 1 hour on a water bath. Then, the reaction mixture is poured into ice-water and shaken with chloroform. Removing the solvent from the chloroform layer, the resulting substance is crystallized from methanol to give 3-methoxy-4-nitro-6-methylpyridazine-1-oxide (0.14 part by weight) as prisms melting at 101 to 101.5° C.

*Analysis.*—Calcd. for $C_6H_7O_4N_3$: C, 38.92; H, 3.81; N, 22.70. Found: C, 39.33; H, 4.10; N, 22.84.

EXAMPLE 2

In the same manner as described in Example 1, 3-ethoxy-6-methylpyridazine is converted into 3-ethoxy-4-nitro-6-methylpyridazine-1-oxide through 3-ethoxy-6-methylpyridazine-1-oxide.

What is claimed is:
1. 3-lower alkoxy-4-nitro-6-lower alkylpyridazine-1-oxide.
2. 3-methoxy-4-nitro-6-methylpyridazine-1-oxide.
3. 3-ethoxy-4-nitro-6-methylpyridazine-1-oxide.

References Cited by the Examiner
UNITED STATES PATENTS

| 2,624,730 | 1/53 | Steck | 260—250 |
| 2,640,005 | 5/53 | Ligett et al. | 260—250 |

OTHER REFERENCES

Nakagome: J. Pharm. Soc., Japan, vol. 81, No. 4 (1961), pages 554–7.

Nakagome: J. Pharm. Soc., Japan, vol. 82, No. 2 (1962), pages 253–6.

IRVING MARCUS, *Primary Examiner.*

WALTER A. MODANCE, *Examiner.*